US011385466B2

(12) United States Patent
Lee et al.

(10) Patent No.: US 11,385,466 B2
(45) Date of Patent: Jul. 12, 2022

(54) HEAD MOUNTED DISPLAY DEVICE AND METHOD OF PROVIDING CONTENT USING THE SAME

(71) Applicant: SAMSUNG DISPLAY CO., LTD., Yongin-si (KR)

(72) Inventors: Cheon Myeong Lee, Yongin-si (KR); Young Chan Kim, Yongin-si (KR); Jae Ho You, Yongin-si (KR); Min Gyeong Jo, Yongin-si (KR); Joo Woan Cho, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/173,819

(22) Filed: Feb. 11, 2021

(65) Prior Publication Data

US 2021/0405370 A1  Dec. 30, 2021

(30) Foreign Application Priority Data

Jun. 25, 2020  (KR) .................. 10-2020-0078097

(51) Int. Cl.
*G02B 27/01* (2006.01)

(52) U.S. Cl.
CPC ..... *G02B 27/0172* (2013.01); *G02B 27/0179* (2013.01); *G02B 2027/0178* (2013.01); *G02B 2027/0187* (2013.01)

(58) Field of Classification Search
CPC ............ G02B 27/0172; G02B 27/0179; G02B 2027/0178; G02B 2027/0187
See application file for complete search history.

(56) References Cited

U.S. PATENT DOCUMENTS

| 5,825,539 | A | * | 10/1998 | Hoshi | ................. | H04N 13/344 |
| | | | | | | 359/464 |
| 9,472,025 | B2 | | 10/2016 | Thomas | | |
| 9,910,282 | B2 | | 3/2018 | Petrov | | |
| 10,261,324 | B2 | * | 4/2019 | Chuang | .............. | G02B 27/0172 |
| 10,522,110 | B1 | * | 12/2019 | Zhang | ..................... | G09G 5/10 |
| 10,598,942 | B1 | * | 3/2020 | Richards | ............ | G02B 27/0172 |
| 10,942,544 | B2 | * | 3/2021 | Xu | .......................... | G06F 1/163 |

(Continued)

FOREIGN PATENT DOCUMENTS

| JP | 2017204674 A | 11/2017 |
| KR | 101902957 B1 | 10/2018 |

(Continued)

*Primary Examiner* — Dmitriy Bolotin
(74) *Attorney, Agent, or Firm* — Cantor Colburn LLP

(57) ABSTRACT

A head mounted display device includes a lens assembly which changes a path of light; a main display module which outputs a main image and is positioned in front of the lens assembly; a main optical block which shields at least a portion of a light representing the main image such that the light representing the main image faces the lens assembly; a sub-display module disposed on a side of the main optical block and which outputs a sub-image; a sub-optical block positioned on the side of the main optical block and which shields at least a portion of a light representing the sub-image; and a light path converter positioned in the sub-optical block and which changes a path of the light representing the sub-image such that the light representing the sub-image faces the lens assembly.

20 Claims, 10 Drawing Sheets

(56) References Cited

U.S. PATENT DOCUMENTS

| | | | |
|---|---|---|---|
| 2015/0235426 A1* | 8/2015 | Lyons | A63F 13/26 345/8 |
| 2015/0253574 A1* | 9/2015 | Thurber | G02B 27/0172 359/630 |
| 2016/0018645 A1* | 1/2016 | Haddick | G06F 1/163 345/8 |
| 2017/0011210 A1* | 1/2017 | Cheong | A61B 5/681 |
| 2017/0324899 A1 | 11/2017 | Ohba | |
| 2021/0311547 A1* | 10/2021 | Kuehne | G06F 3/012 |
| 2021/0405370 A1* | 12/2021 | Lee | G02B 27/0172 |

FOREIGN PATENT DOCUMENTS

| | | |
|---|---|---|
| KR | 101968276 B1 | 4/2019 |
| WO | 2019149191 A1 | 8/2019 |

\* cited by examiner

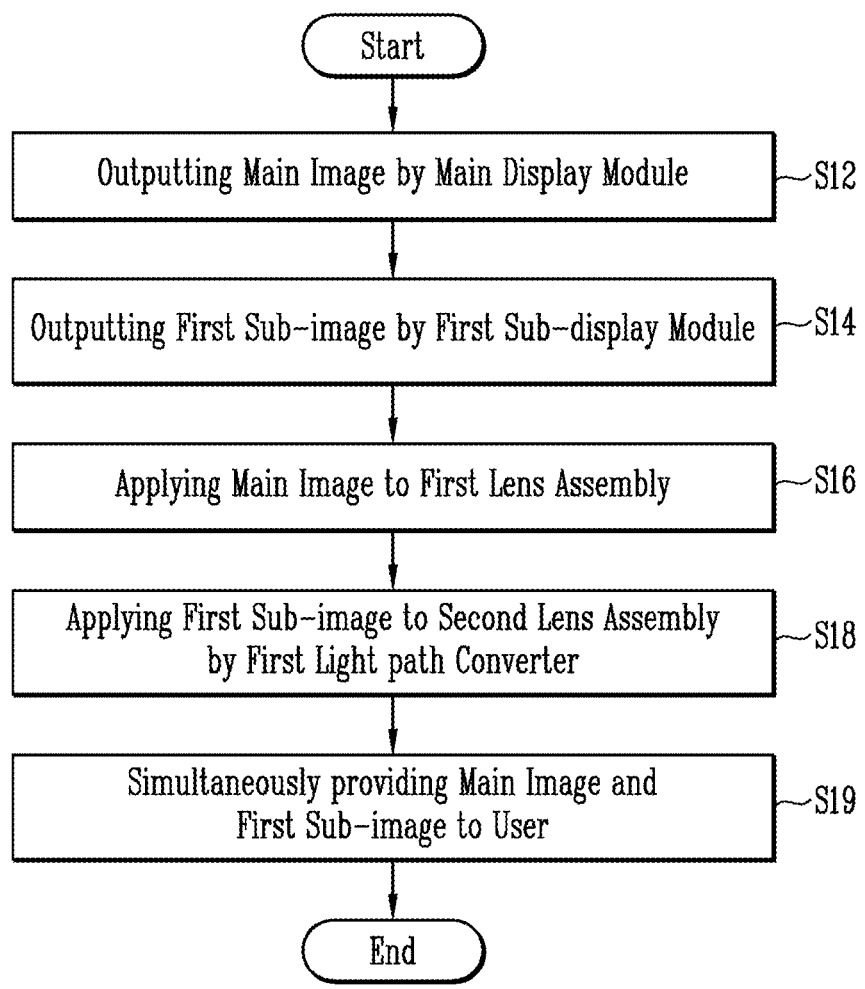

HEAD MOUNTED DISPLAY DEVICE AND METHOD OF PROVIDING CONTENT USING THE SAME

The application claims priority to Korean Patent Application No. 10-2020-0078097, filed Jun. 25, 2020, and all the benefits accruing therefrom under 35 U.S.C. § 119, the content of which in its entirety is herein incorporated by reference.

BACKGROUND

Field

The present invention relates to a head mounted display device and a method of providing content using the same, and more particularly, to a head mounted display device in which light provided from a display is provided to a user through a predetermined reflective element, and a method of providing content using the same.

Discussion

Recently, researches on wearable devices including display devices have been actively conducted. Particularly, a head mounted display device, which is one of the wearable devices including the display devices, may be mounted on a user's head to provide visual information having a higher sense of reality to a user.

However, in the conventional head mounted display device, visual data is provided to the user in a limited space, and the visual data is output at a viewing angle limited to a specific range.

In order to increase the viewing angle, a method for increasing the size of a display module provided in the head mounted display device may be used, but in this case, the volume and/or mass of the head mounted display device may increase, causing inconvenience to the user.

Accordingly, there is a growing demand for a device in which the viewing angle is improved and an increase in the volume and/or mass of the display device is minimized.

SUMMARY

An aspect of the invention is to provide a head mounted display device in which a viewing angle for an image provided from a display module increases and an increase in volume or mass is minimized, and a method of providing content using the same.

However, aspects of the present invention are not limited to the above-described aspect, and other aspects not mentioned will be clearly understood by those skilled in the art from the following description.

A head mounted display device according to an embodiment of the present invention includes: a lens assembly which changes a path of light; a main display module which outputs a main image and is positioned in front of the lens assembly; a main optical block which shields at least a portion of a light representing the main image so that the light representing the main image faces the lens assembly; a sub-display module disposed on a side of the main optical block and which outputs a sub-image; a sub-optical block positioned on the side of the main optical block and which shields at least a portion of a light representing the sub-image; and a light path converter positioned in the sub-optical block and which changes a path of the light representing the sub-image so that the light representing the sub-image faces the lens assembly.

The light path converter may include a reflective type diffraction grating.

The light path converter may be positioned in the sub-optical block to face a surface of the sub-display module from which the sub-image is provided.

The light representing the sub-image may be provided to the light path converter along a first direction, and may be reflected from the light path converter to be provided to the lens assembly along a second direction different from the first direction.

The lens assembly may change a path of the light representing the main image and a path of the light representing the sub-image to provide the lights to a position corresponding to a focus of user's eyes.

The head mounted display device may further include a light collimator positioned on the sub-display module and which changes the light representing the sub-image provided from the sub-display module into collimated light.

The main optical block may be positioned between the lens assembly and the main display module.

The sub-image may correspond to an edge portion image of the main image.

The edge portion image of the main image may be an image output from a partial area adjacent to the sub-display module in the main display module.

The sub-display module may include a first sub-display module and a second sub-display module, the first sub-display module may be disposed on a first surface of the main optical block, and the second sub-display module may be disposed on a second surface of the main optical block facing the first surface.

The sub-image may be the edge portion image of the main image, and an edge portion image of the main image may include a first edge portion image and a second edge portion image. The first edge portion image may correspond to an image output from a first partial area of the main display module adjacent to the first sub-display module, and the second edge portion image may correspond to an image output from a second partial area of the main display module adjacent to the second sub-display module.

The head mounted display device may define a first space positioned between the main optical block and the lens assembly; a second space positioned between the sub-optical block and the light path converter; and an opening fluidly connecting the first space and the second space.

The head mounted display device may further include a light transmission type diffraction unit positioned on the sub-display module and which changes a direction of the light output from the sub-display module.

The main display module and the sub-display module may be separate components.

The main display module and the sub-display module may include a predetermined display panel, and the predetermined display panel may be at least one of an organic light emitting display panel, a nano-scale LED display panel, a quantum dot organic light emitting display panel, a liquid crystal display panel, an electrophoretic display panel, or an electro-wetting display panel.

The lens assembly may be disposed to correspond to a position of a user's eyes when the user wears the head mounted display device.

According to an embodiment of the present invention, a method of providing content using a head mounted display device including a lens assembly which changes a path of light; a main display module outputting a main image and positioned in front of the lens assembly; a main optical block which shields at least a portion of a light representing the main image such that the light representing the main image faces the lens assembly; a sub-display module disposed on a side of the main optical block and which outputs a sub-image; a sub-optical block positioned on the side of the main optical block and which shields at least a portion of the light representing the sub-image such that the light representing the sub-image is not exposed to an outside; and a light path converter positioned in the sub-optical block and which changes a path of the light the light representing the sub-image such that the light representing the sub-image faces the lens assembly, may include: outputting, by the main display module, the main image; outputting, by the sub-display module, the sub-image corresponding to a part of the main image output from an edge area of the main display module; providing the light representing the main image to the lens assembly; providing, by the light path converter, the light representing the sub-image to the lens assembly; and simultaneously providing the main image provided to the lens assembly and the sub-image provided to the lens assembly by the light path converter to a user.

The edge area of the main display module may be a partial area of the main display module adjacent to the sub-display module.

The light path converter may be positioned in the sub-optical block to face a surface of the sub-display module from which the sub-image is provided.

In the simultaneously providing of the main image and the sub-image, a viewing angle for the main image and the sub-image provided to the user may increases compared with a viewing angle when only the main image is provided.

Means for solving the technical problems of the present invention are not limited to the above-described solutions. Solutions that are not mentioned may be clearly understood by those skill in the art from the present specification and the accompanying drawings.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts.

FIG. 10 is a flowchart illustrating a method of providing content using a head mounted display device according to an embodiment of the present invention.

DETAILED DESCRIPTION

Figure 1:
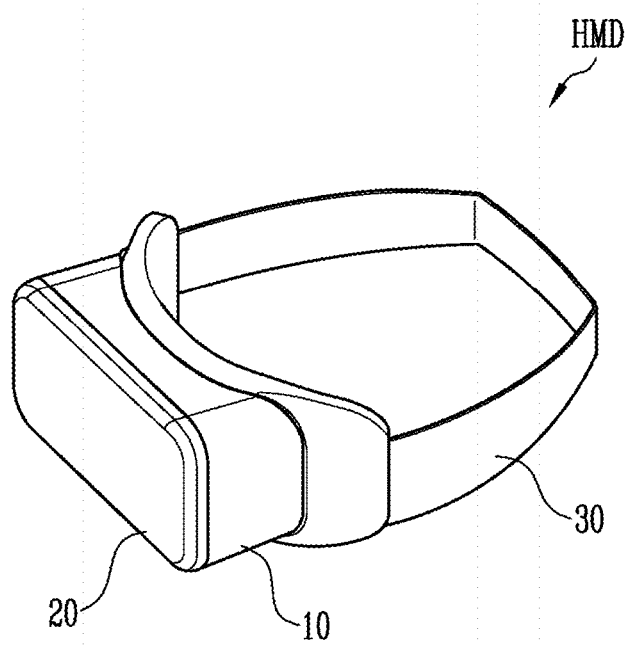
FIG. 1 is a perspective view illustrating a head mounted display device according to an embodiment of the present invention.

The embodiments described in the present specification are intended to clearly explain the spirit of the present invention to those skilled in the art to which the present invention pertains. Therefore, the present invention is not limited by the embodiments described herein. The scope of the present invention should be construed as including modifications or variations that do not depart from the spirit of the present invention.

Terms used in the present specification have been selected from general terms that are currently widely used in consideration of functions of the present invention. However, this may vary according to the intention or custom of a person skilled in the art to which the present invention pertains, or the emergence of new technologies. However, unlike this, when a specific term is defined and used in an arbitrary meaning, the meaning of the term will be separately described. Therefore, the terms used in the present specification should be interpreted based on the actual meanings of the terms and contents throughout the present specification, not the names of the terms.

The drawings attached to the present specification are for easily explaining the present invention. Shapes of the components shown in the drawings may be exaggerated and displayed as necessary to aid understanding of the present invention. Therefore, the present invention is not limited by the drawings.

In the present specification, when it is determined that a detailed description of a well-known configuration or function related to the present invention may obscure the subject matter of the present invention, a detailed description thereof will be omitted as necessary.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an."

"Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The present invention relates to a head mounted display device and a method of providing content using the same, and more particularly, a head mounted display device in which light provided from a display is provided to a user through a predetermined reflective element, and a method of providing content using the same.

Hereinafter, a head mounted display device according to embodiments of the present invention will be described with reference to FIGS. 1 to 10.

FIG. 1 is a perspective view illustrating a head mounted display device according to an embodiment of the present invention.

A head mounted display device HMD is a device configured to provide visual data to a user, and refers to a device that can be mounted (or worn) on a user's head. When the head mounted display device HMD is worn, image data is provided to user's eyes so that the user can visually recognize image information provided from the head mounted display device HMD.

The head mounted display device HMD may include a housing 10, a display unit 20, and a mounting unit 30.

The display unit 20 and the mounting unit 30 may be connected to the housing 10. The housing 10 may support an external shape of the head mounted display device HMD.

An electrical configuration configured to operate the display unit 20 may be included in the housing 10. According to an embodiment, a driving power source and a processor for driving the display unit 20 may be included in the housing 10.

The display unit 20 may be positioned on one surface of the housing 10. According to an embodiment, when the head mounted display device HMD is mounted on the user, the display unit 20 may be disposed on a surface opposite to a surface of the housing 10 adjacent to a user's face.

Figure 2:
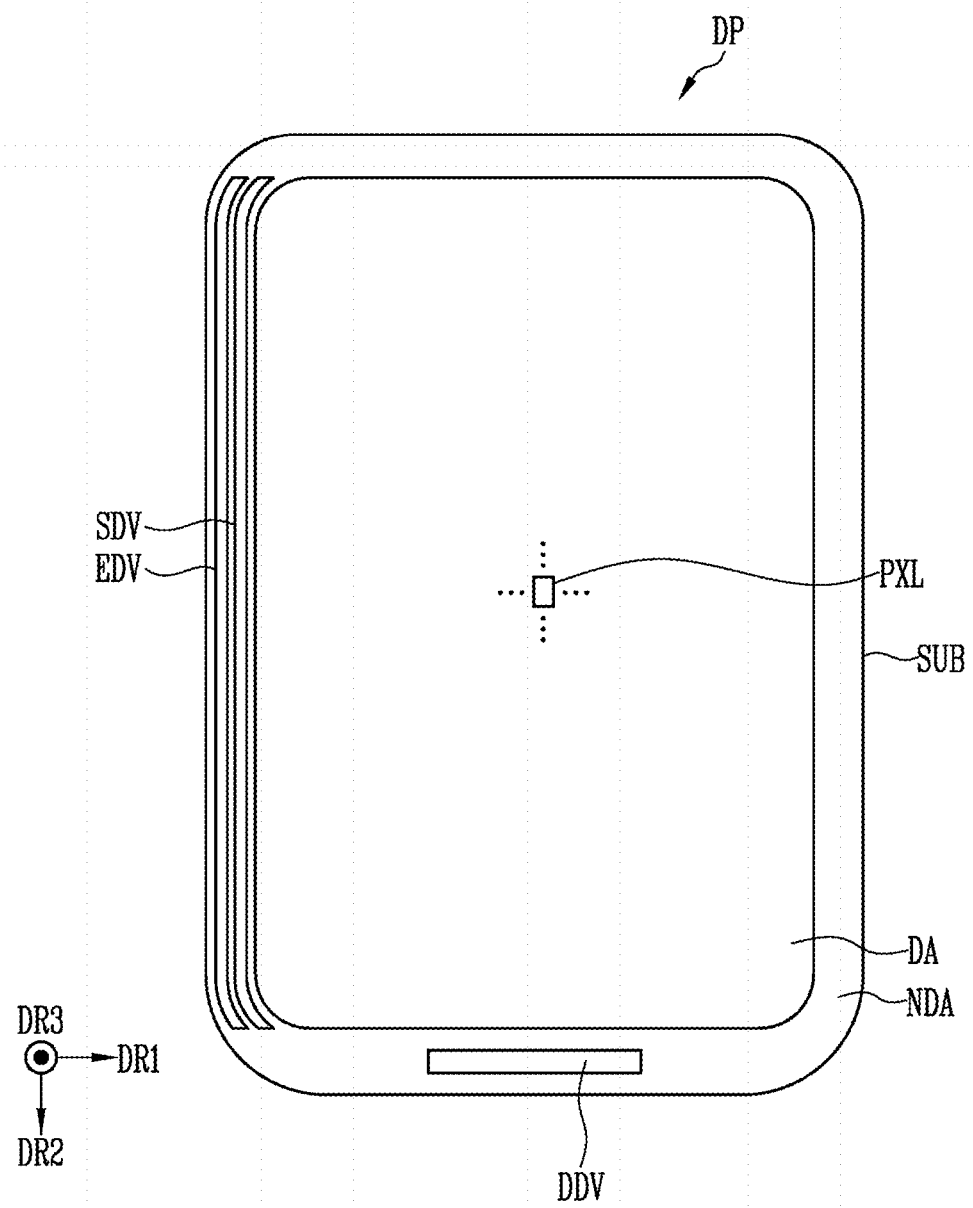
FIG. 2 is a plan view schematically illustrating a display panel included in a display unit of the head mounted display device according to an embodiment of the present invention.

The display unit 20 may include a display panel (refer to "DP" in FIG. 2). The display panel DP may refer to a configuration including a light emitting element (refer to "LD" in FIG. 3) capable of emitting light when an electrical signal is applied.

The configuration and operation of the display unit 20 will be described later with reference to FIGS. 5 to 9.

The mounting unit 30 may be positioned on the other surface of the housing 10 opposite to the surface of the housing 10 where the display unit 20 is attached. According to an embodiment, when the head mounted display device HMD is mounted on the user, the mounting unit 30 may be physically connected to at least a portion of the surface of the housing 10 adjacent to the user's face.

The mounting unit 30 may assist to mount the head mounted display device HMD on the user's head. According to an embodiment, the mounting unit 30 may be provided as a form of a band having elasticity. In this case, the head mounted display device HMD may be fixed at a predetermined position with respect to the user's head due to restoring force of the mounting unit 30. Alternatively, although not shown in the drawings, the mounting unit 30 may be provided as a form of legs of glasses. However, embodiments of the mounting unit 30 according to the invention are not limited to the above-described embodiments or drawings. Various embodiments for implementing the above-described functions may be applied to the head mounted display device HMD according to the present invention.

FIG. 2 is a plan view schematically illustrating a display panel included in a display unit of the head mounted display device according to an embodiment of the present invention.

Referring to FIG. 2, the display panel DP may include a substrate SUB, pixels PXL, a driving unit, and a wiring unit. The driving unit may include a scan driver SDV, an emission driver EDV, and a data driver DDV.

The display panel DP may output the visual data. As the display panel DP, a self-light emitting display panel such as an organic light emitting display panel using an organic light emitting diode ("OLED") as the light emitting element, a nano-scale LED display panel using a nano-scale LED as the light emitting element, and a quantum dot organic light emitting display ("QD" OLED) panel using a quantum dot and the organic light emitting diode may be used. However, the present invention is not limited to the above-described examples. In another embodiment, the display panel DP may be at least any one of a liquid crystal display ("LCD") panel, an electrophoretic display ("EPD") panel, and an electrowetting display ("EWD") panel.

The substrate SUB may include a display area DA and a non-display area NDA. The non-display area NDA may surround the display area DA.

The pixels PXL may be positioned on the substrate SUB. The pixels PXL may be positioned in the display area DA. Light may be emitted in a third direction DR3 in the display area DA. The pixels PXL may be arranged in a matrix form along a row extending along a first direction DR1 and a column extending along a second direction DR2.

At least one of the scan driver SDV, the emission driver EDV, and the data driver DDV may be positioned in the non-display area NDA together with the wiring unit. In an embodiment, the non-display area NDA may not include the pixels PXL.

The substrate SUB may include a rigid material or a flexible material depending on the purpose of which a display device DD is used. However, the material of the substrate SUB applied to the embodiment of the present invention is not limited to a specific example.

When viewed from the top (i.e., in a plan view), the scan driver SDV, the emission driver EDV, and the data driver DDV may be positioned in the non-display area NDA. The scan driver SDV, the emission driver EDV, and the data driver DDV may output electrical information provided to the pixels PXL. When the electrical information is provided to the pixels PXL, the light emitting element LD included in each of the pixels PXL may emit light.

The scan driver SDV may transmit a scan signal to the pixels PXL through a scan line.

The emission driver EDV may provide an emission control signal to the pixels PXL through an emission control line.

The data driver DDV may provide a data signal to the pixels PXL through a data line.

When viewed from the top, the wiring unit may be positioned in the non-display area NDA. The wiring unit may electrically connect the driving unit and the pixels PXL.

Figure 3:
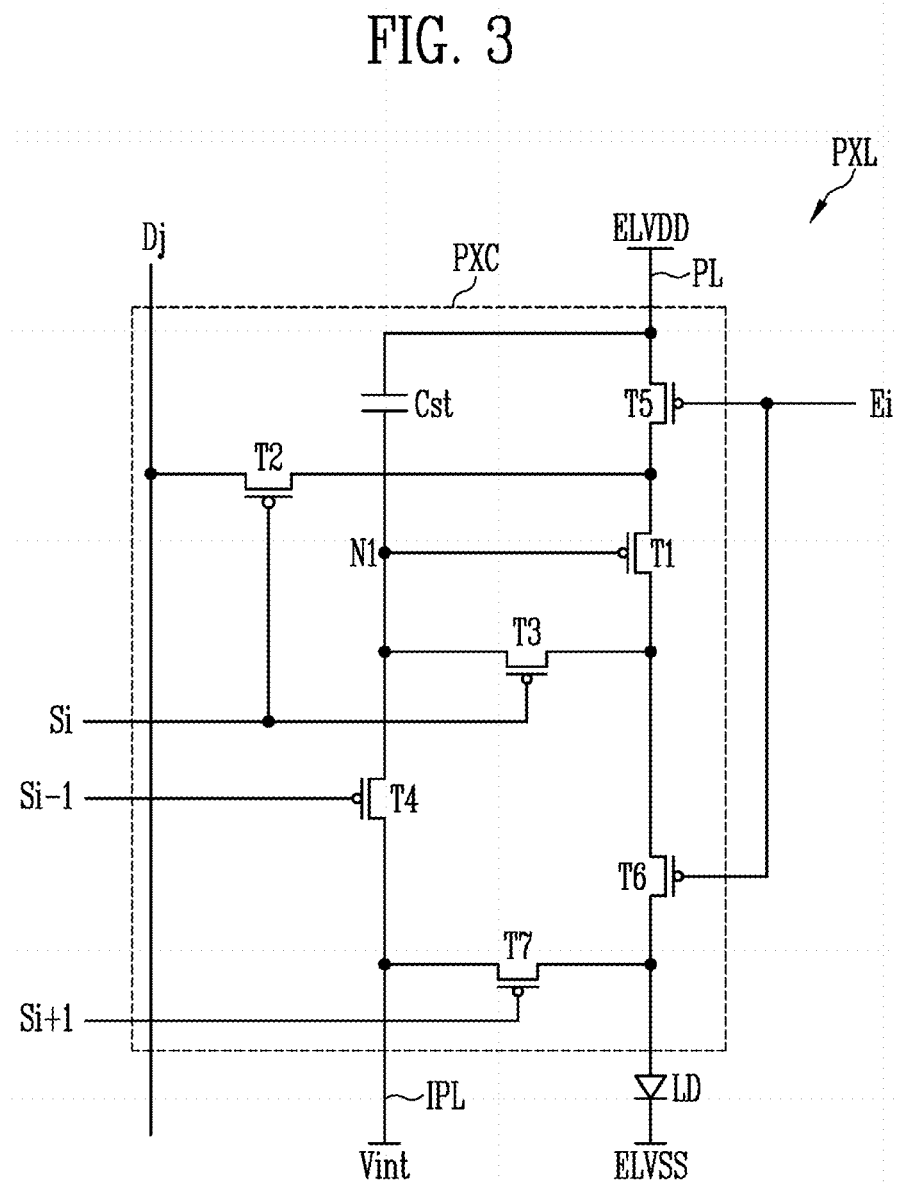
FIG. 3 is a circuit diagram illustrating a pixel driving circuit of each pixel included in the head mounted display device according to an embodiment of the present invention.

FIG. 3 is a circuit diagram illustrating a pixel driving circuit of each pixel included in the head mounted display device according to an embodiment of the present invention.

Each pixel PXL included in the display panel DP according to an embodiment of the present invention may include a pixel driving circuit PXC.

The pixel driving circuit PXC may include first to seventh transistors T1 to T7 and a storage capacitor Cst. The pixel driving circuit PXC may be electrically connected to the light emitting element LD.

A first electrode of the first transistor T1 may be connected to a first power source ELVDD via the fifth transistor T5, and a second electrode of the first transistor T1 may be connected to an anode electrode of the light emitting element LD via the sixth transistor T6. The first transistor T1 may control a current flowing from the first power source ELVDD to a second power source ELVSS via the light emitting element LD based on a voltage of a first node N1. The first transistor T1 may be a driving transistor.

The second transistor T2 may be connected between the first electrode of the first transistor T1 and a j-th data line Dj. A gate electrode of the second transistor T2 may be connected to an i-th scan line Si. The second transistor T2 may be turned on when the scan signal is applied from the i-th scan line Si to electrically connect the j-th data line Dj and the first electrode of the first transistor T1. The second transistor T2 may be a switching transistor.

The third transistor T3 may be connected between the second electrode of the first transistor T1 and the first node N1. The third transistor T3 may be turned on when the scan signal of a gate-on voltage is applied from the i-th scan line Si to electrically connect the second electrode of the first transistor T1 and the first node N1.

The fourth transistor T4 may be connected between the first node N1 and an initialization power source line IPL to which an initialization power source Vint is applied. A gate electrode of the fourth transistor T4 may be connected to an (i−1)th scan line Si−1. The fourth transistor T4 may be turned on when the scan signal is applied to the (i−1)th scan line Si−1 to supply a voltage of the initialization power source Vint to the first node N1. The fourth transistor T4 may be an initialization transistor.

The fifth transistor T5 may be connected between a power source line PL to which the first power source ELVDD is applied and the first transistor T1. A gate electrode of the fifth transistor T5 may be connected to an i-th emission control line Ei. The fifth transistor T5 may be turned off when the emission control signal (for example, a high level voltage) of a gate-off voltage is applied from the i-th emission control line Ei, and may be turned on in other cases.

The sixth transistor T6 may be connected between the first transistor T1 and the light emitting element LD. A gate electrode of the sixth transistor T6 may be connected to the i-th emission control line Ei. The sixth transistor T6 may be turned off when the emission control signal of the gate-off voltage is applied from the i-th emission control line Ei, and may be turned on in other cases.

The seventh transistor T7 may be connected between the initialization power source line IPL and the anode electrode of the light emitting element LD. A gate electrode of the seventh transistor T7 may be connected to an (i+1)th scan line Si+1. The seventh transistor T7 may be turned on when the scan signal of the gate-on voltage (for example, a low level voltage) is applied from the (i+1)th scan line Si+1 to supply a voltage of the initialization power source Vint to the anode electrode of the light emitting element LD. A signal applied to the gate electrode of the seventh transistor T7 may be a signal having the same timing as the scan signal of the gate-on voltage applied from the i-th scan line Si.

In this case, the voltage of the initialization power source Vint may be set to a voltage lower than that of the data signal. For example, the voltage of the initialization power source Vint may be set to be less than or equal to the lowest voltage of the data signal.

The storage capacitor Cst may be connected between the power source line PL to which the first power source ELVDD is applied and the first node N1. The storage capacitor Cst may store information on the data signal and information on a voltage corresponding to a threshold voltage of the first transistor T1.

The anode electrode of the light emitting element LD may be connected to the first transistor T1 via the sixth transistor T6. A cathode electrode of the light emitting element LD may be connected to the second power source ELVSS.

The light emitting element LD may emit light having a predetermined luminance corresponding to the amount of current supplied from the first transistor T1. A voltage value of the first power source ELVDD may be set higher than that of the second power source ELVSS so that the current flows through the light emitting element LD.

The light emitting element LD may be composed of the organic light emitting diode or an inorganic light emitting diode such as a micro light emitting diode ("LED") and a quantum dot light emitting diode. In addition, the light emitting element LD may be a light emitting element composed of a composite of an organic material and an inorganic material.

In FIG. 3, the pixel PXL is shown to include a single light emitting element LD. However, in another embodiment, the pixel PXL may include a plurality of light emitting elements LD. The plurality of light emitting elements LD may be connected to each other in series, in parallel, or in series and parallel.

Hereinafter, for convenience of description, the case where the light emitting element LD included in the head mounted display device HMD is the organic light emitting diode (OLED) will be described as an example.

Additionally, in FIG. 3, the case in which the pixel PXL is driven by signals of the i-th scan line Si, the (i−1)th scan line Si−1, and the (i+1)th scan line Si+1 is described as an example, but the present invention is not limited thereto. In another embodiment, for example, the i-th scan line Si, the (i−1)th scan line Si−1, and the (i+1)th scan line Si+1 may be separate signal lines each receiving scan signals from different scan drivers SDV.

Hereinafter, a detailed individual structure of the display panel DP included in the head mounted display device HMD according to an embodiment of the present invention will be described with reference to FIG. 4.

Figure 4:
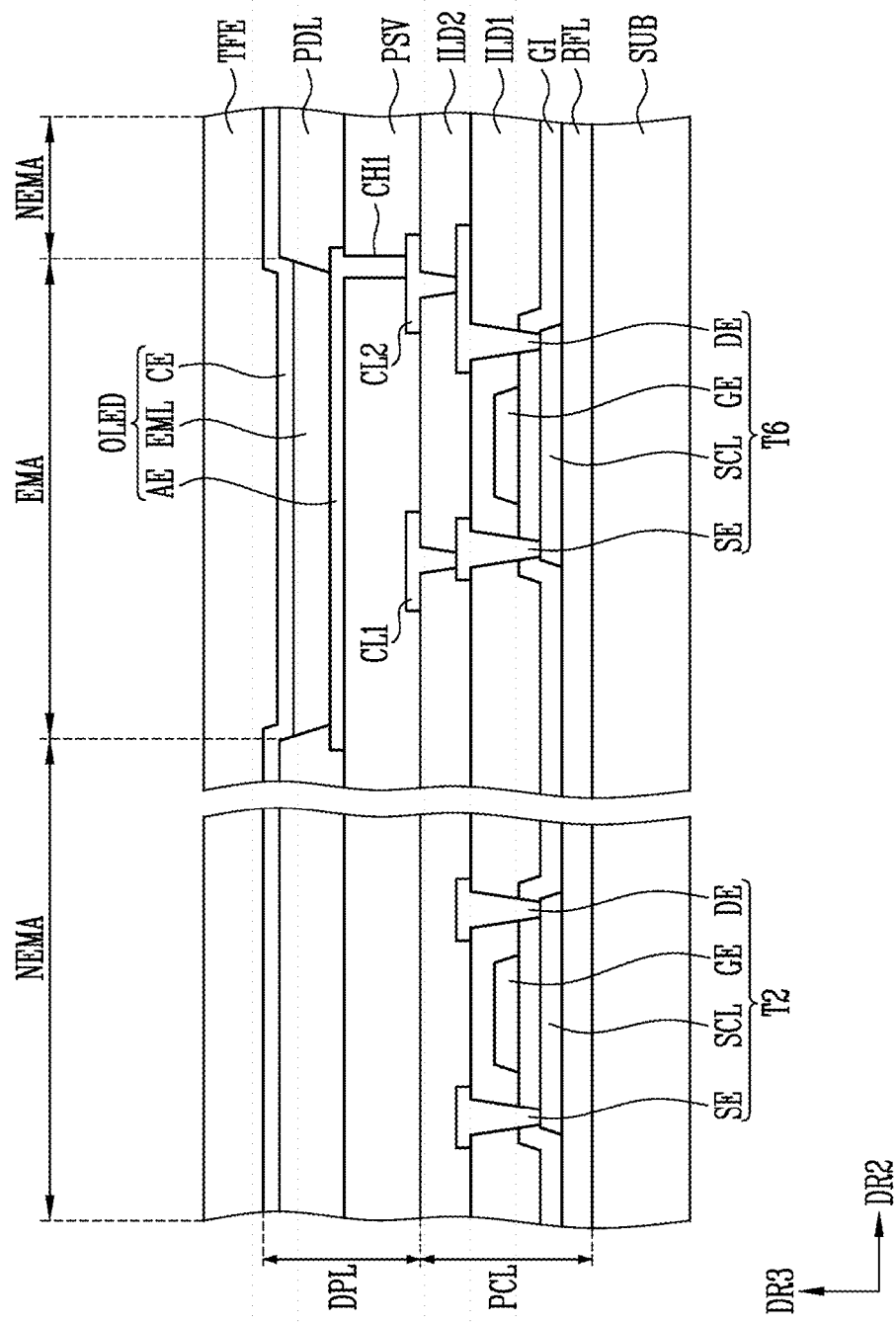
FIG. 4 is a cross-sectional view of the display panel included in the head mounted display device according to an embodiment of the present invention.

FIG. 4 is a cross-sectional view of the display panel included in the head mounted display device according to an embodiment of the present invention.

FIG. 4 may be a cross-sectional view showing a cross section of the display panel DP when the display panel DP shown in FIG. 2 is viewed in the first direction (refer to "DR1" in FIG. 2). In FIG. 4, for convenience of explanation, among the first to seventh transistors T1 to T7 shown in FIG. 3, only cross-sections of portions corresponding to the second and sixth transistors T2 and T6 are shown.

The display panel DP may include the substrate SUB, a pixel circuit unit PCL, a light emitting element unit DPL, and a thin film encapsulation layer TFE.

The substrate SUB may include the rigid material or the flexible material. The flexible material may include, for example, at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, cellulose triacetate, or cellulose acetate propionate. However, the material of the substrate SUB applied to the embodiment of the present invention is not limited to a specific example.

The pixel circuit unit PCL may be positioned on the substrate SUB. The pixel circuit unit PCL may include a buffer layer BFL, a gate insulating layer GI, the second transistor T2, the sixth transistor T6, a first interlayer insulating layer ILD1, a second interlayer insulating layer ILD2, a first conductive line CL1, a second conductive line CL2, a first contact hole CH1, and a passivation layer PSV.

The buffer layer BFL may be positioned on the substrate SUB. The buffer layer BFL may prevent diffusion of impurities into the sixth transistor T6 and/or the second transistor T2.

The buffer layer BFL may include at least one of metal oxides such as silicon nitride (SiNx), silicon oxide (SiOx), silicon oxynitride (SiOxNy), and aluminum oxide (AlOx). However, according to embodiments, the buffer layer BFL may be omitted.

The second transistor T2 may be positioned in a non-light emitting area NEMA, and the sixth transistor T6 may be positioned in a light emitting area EMA. However, the present invention is not limited thereto. According to embodiments, the second transistor T2 may be positioned in the light emitting area EMA.

In this case, a light emitting layer EML of the organic light emitting diode OLED may be positioned in the light emitting area EMA. The light emitting layer EML of the organic light emitting diode OLED may not be positioned in the non-light emitting area NEMA.

Each of the second transistor T2 and the sixth transistor T6 may include a semiconductor pattern SCL, a source electrode SE, a drain electrode DE, and a gate electrode GE.

The semiconductor pattern SCL may be positioned on the buffer layer BFL.

The semiconductor pattern SCL may be a semiconductor layer. According to an embodiment, the semiconductor pattern SCL may include at least one of polysilicon, amorphous silicon, and oxide semiconductor.

The semiconductor pattern SCL may include a first contact region in contact with the source electrode SE and a second contact region in contact with the drain electrode DE.

The first contact region and the second contact region may be a semiconductor pattern doped with impurities. A region between the first contact region and the second contact region may be a channel region. The channel region may be an intrinsic semiconductor pattern that is not doped with impurities.

The gate insulating layer GI may be provided on the semiconductor pattern SCL. The gate insulating layer GI may include the inorganic material. According to an embodiment, the gate insulating layer GI may include at least one of silicon nitride (SiNx), silicon oxide (SiOx), silicon oxynitride (SiON), or aluminum oxide (AlOx). According to an embodiment, the gate insulating layer GI may include the organic material.

The gate electrode GE may be positioned on the gate insulating layer GI.

A position of the gate electrode GE may correspond to that of the channel region of the semiconductor pattern SCL. For example, the gate electrode GE may be disposed on the channel region of the semiconductor pattern SCL with the gate insulating layer GI interposed therebetween.

The first interlayer insulating layer ILD1 may be positioned on the gate electrode GE. Like the gate insulating layer GI, the first interlayer insulating layer ILD1 may include at least one of silicon nitride (SiNx), silicon oxide (SiOx), silicon oxynitride (SiOxNy), or aluminum oxide (AlOx).

The source electrode SE and the drain electrode DE may be positioned on the first interlayer insulating layer ILD1. The source electrode SE may penetrate the gate insulating layer GI and the first interlayer insulating layer ILD1 to contact the first contact region of the semiconductor pattern SCL, and the drain electrode DE may penetrate the gate insulating layer GI and the first interlayer insulating layer ILD1 to contact the second contact region of the semiconductor pattern SCL.

In the above-described embodiment, the source electrode SE and the drain electrode DE of each of the second transistor T2 and the sixth transistor T6 are described as separate electrodes electrically connected to the semiconductor pattern SCL of the corresponding transistor by penetrating the gate insulating layer GI and the first interlayer insulating layer ILD1. However, the present invention is not limited thereto. According to an embodiment, the source electrode SE of each of the second and sixth transistors T2 and T6 may be one of the first and second contact regions adjacent to the channel region of the semiconductor pattern SCL of the corresponding transistor. In addition, the drain electrode DE of each of the second and sixth transistors T2 and T6 may be the other of the first and second contact regions adjacent to the channel region of the semiconductor pattern SCL. In this case, the drain electrode DE of each of the second and sixth transistors T2 and T6 may be electrically connected to some elements of the light emitting element unit DPL through a separate connection means including a contact electrode and the like.

The second interlayer insulating layer ILD2 may be positioned on the source electrode SE and the drain electrode DE. Like the first interlayer insulating layer ILD1 and the gate insulating layer GI, the second interlayer insulating layer ILD2 may include the inorganic material. The inorganic material may include materials exemplified as the materials constituting the first interlayer insulating layer ILD1 and the gate insulating layer GI, and for example, at least one of silicon nitride (SiNx), silicon oxide (SiOx), silicon oxynitride (SiOxNy), or aluminum oxide (AlOx). According to an embodiment, the second interlayer insulating layer ILD2 may include the organic material.

The first conductive line CL1 may be positioned on the second interlayer insulating layer ILD2 and may be electrically connected to the source electrode SE through a contact hole penetrating the second interlayer insulating layer ILD2.

The second conductive line CL2 may be positioned on the second interlayer insulating layer ILD2 and may be electrically connected to the drain electrode DE through a contact hole penetrating the second interlayer insulating layer ILD2.

The first conductive line CL1 and the second conductive line CL2 may be paths through which the electrical signal may flow. In particular, the second conductive line CL2 may be a bridge electrode electrically connecting the drain electrode DE of the sixth transistor T6 and some elements of the light emitting element unit DPL. According to an embodiment, the first conductive line CL1 and the second conductive line CL2 may include at least one of molybdenum (Mo), tungsten (W), aluminum-neodymium (AlNd), titanium (Ti), aluminum (Al), or silver (Ag).

The passivation layer PSV may be provided on the first conductive line CL1 and the second conductive line CL2.

The passivation layer PSV may be provided in a form including an organic insulating layer, an inorganic insulating layer, or the organic insulating layer disposed on the inorganic insulating layer.

The passivation layer PSV may include a first contact hole CH1 exposing a portion of the second conductive line CL2.

The first contact hole CH1 may be a path through which the electrical signal provided from the sixth transistor T6 is transmitted.

The light emitting element unit DPL may include a pixel defining layer PDL and the organic light emitting diode OLED.

The pixel defining layer PDL may define a position where the organic light emitting diode OLED is arranged.

The pixel defining layer PDL may include the organic material. According to an embodiment, the pixel defining layer PDL may include at least one of acrylic resin, epoxy resin, phenolic resin, polyamide resin, or polyimide resin.

The organic light emitting diode OLED may include a first electrode AE, the light emitting layer EML, and a second electrode CE. The organic light emitting diode OLED may be positioned on the passivation layer PSV in the display area DA.

In this case, one of the first and second electrodes AE and CE may be the anode electrode, and the other may be the cathode electrode. When the organic light emitting diode OLED is a top emission type organic light emitting diode, the first electrode AE may be a reflective electrode, and the second electrode CE may be a transmissive electrode. Hereinafter, the case where the organic light emitting diode OLED is the top emission type organic light emitting diode, and the first electrode AE is the anode electrode will be described as an example.

The first electrode AE may be positioned on the passivation layer PSV in the display area DA. The first electrode AE may be electrically connected to the second conductive line CL2 through the first contact hole CH1. The first electrode AE may include a reflective layer (not shown) capable of reflecting light or a transparent conductive layer (not shown) disposed above or below the reflective layer. For example, the first electrode AE may be composed of multiple layers including a lower transparent conductive layer made of indium tin oxide ("ITO"), a reflective layer made of silver (Ag) and provided on the lower transparent conductive layer, and an upper transparent conductive layer made of the indium tin oxide (ITO) and provided on the reflective layer. At least one of the transparent conductive layer and the reflective layer may be electrically connected to the drain electrode DE of the sixth transistor T6 through the first contact hole CH1 of the passivation layer PSV.

The light emitting layer EML may be disposed in an area defined by the pixel defining layer PDL. The light emitting layer EML may define a light emitting area EMA from which light is emitted. The light emitting layer EML may include the organic material.

Specifically, the light emitting layer EML may have a multilayer thin film structure including at least a light generation layer. The light emitting layer EML may include a hole injection layer for injecting holes, a hole transport layer having excellent hole transport properties and for increasing an opportunity for recombination of holes and electrons by suppressing movement of the electrons that are not combined in the light generating layer, the light generation layer that emits light by recombination of the injected electrons and holes, a hole blocking layer for suppressing movement of the holes that are not combined in the light generation layer, an electron transport layer for smoothly transporting the electrons to the light generation layer, and an electron injection layer for injecting the electrons. As described above, when the electrical signal is applied to the light emitting layer EML, the light may be emitted. The color of the light generated in the light emitting layer EML may be one of red, green, blue, and white, but the present invention is not limited thereto. For example, the color of the light generated in the light emitting layer EML may be one of magenta, cyan, and yellow.

The second electrode CE may be provided on the light emitting layer EML. The second electrode CE may be provided in the form of a plate on the display area DA, but the present invention is not limited thereto. The second electrode CE may include a transparent conductive material such as one transparent conductive oxide selected from indium tin oxide (ITO), indium zinc oxide ("IZO"), aluminum zinc oxide ("AZO"), gallium doped zinc oxide ("GZO"), zinc tin oxide ("ZTO"), gallium tin oxide ("GTO"), and fluorine doped tin oxide ("FTO"). According to an embodiment, when the organic light emitting diode OLED is a bottom emission type organic light emitting diode, the second electrode CE may include a translucent conductive material such as magnesium (Mg), silver (Ag), or an alloy of magnesium (Mg) and silver (Ag).

The thin film encapsulation layer TFE may be positioned on the second electrode CE. The thin film encapsulation layer TFE may include a plurality of insulating layers covering the organic light emitting diode OLED. Specifically, the thin film encapsulation layer TFE may include at least one inorganic layer and/or at least one organic layer. For example, the thin film encapsulation layer TFE may have a structure in which the inorganic layer and the organic layer are alternately stacked.

Hereinafter, the display unit 20 included in the head mounted display device HMD according to the embodiment of the present invention will be described in detail with reference to FIGS. 5 to 7.

Figure 5:
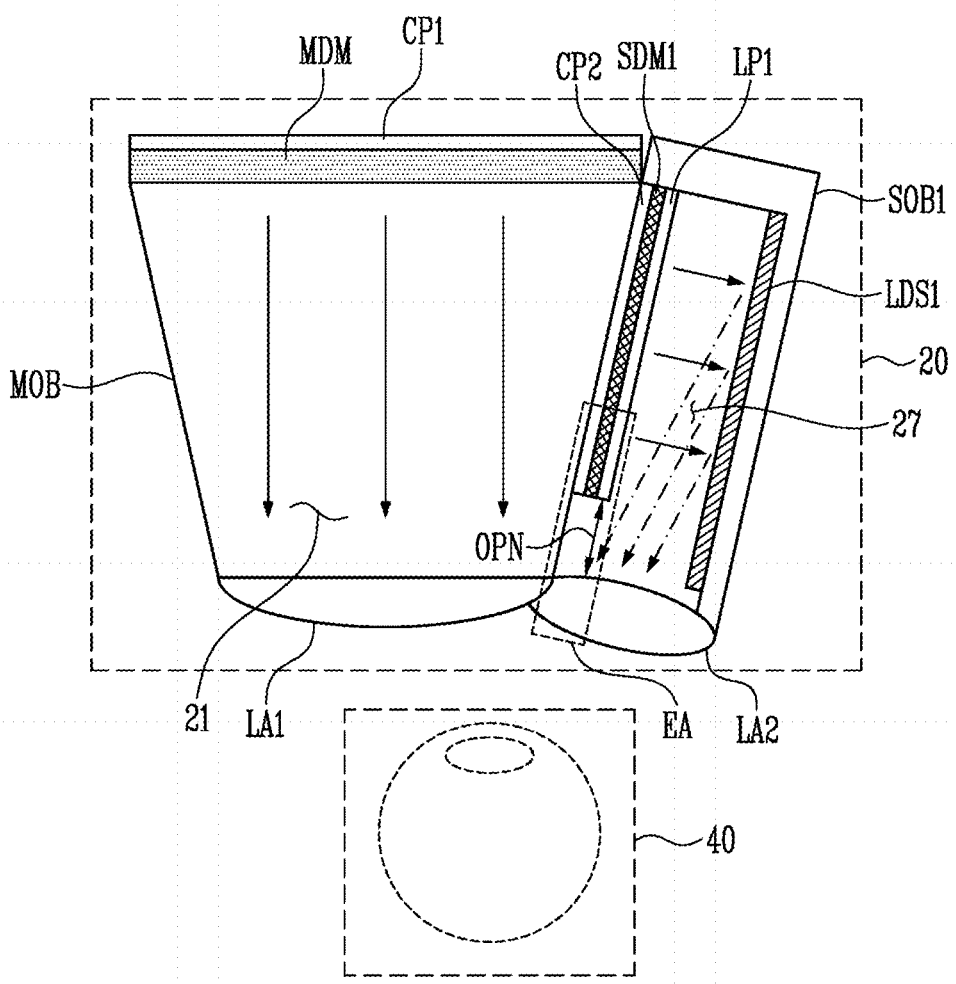
FIG. 5 is a plan view schematically illustrating the display unit of the head mounted display device according to an embodiment of the present invention.

FIG. 5 is a plan view schematically illustrating the display unit of the head mounted display device according to an embodiment of the present invention.

Referring to FIG. 5, the display unit 20 may include a first cover panel CP1, a main display module MDM, a main optical block MOB, a first lens assembly LA1, a second cover panel CP2, a first sub-display module SDM1, a first sub-optical block SOB1, a first light path converter LDS1, a first light collimator LP1, and a second lens assembly LA2.

In this case, the main display module MDM and the first sub-display module SDM1 may refer to the display panel DP described with reference to FIGS. 2 to 4. That is, the display panel DP may include the main display module MDM and the first sub-display module SDM1.

When the head mounted display device HMD is mounted on the user's head, the display unit 20 may be disposed at a position corresponding to the user's eyes 40.

According to embodiments, the display unit 20 may include a first display unit and a second display unit. In this case, when the head mounted display device HMD is mounted on the user's head, the first display unit may correspond to a position of the user's left eye, and the second display unit may correspond to a position of the user's right eye. In this case, the first display unit may apply the image data to the user's left eye, and the second display unit may apply the image data to the user's right eye.

Hereinafter, when the head mounted display device HMD is mounted, the second display unit corresponding to the position of the user's right eye will be described using FIG. 5. However, the technical characteristics of the first display unit corresponding to the position of the user's left eye should be interpreted in the similar way in consideration of the description of the second display unit to be described later.

The first cover panel CP1 may be positioned on one surface of the main display module MDM. The first cover panel CP1 may be arranged on a rear surface opposite to a surface of the main display module MDM on which the main optical block MOB is positioned.

The first cover panel CP1 may reduce an external influence (e.g., damage from external force, and penetration of foreign substance) applied to the main display module MDM. The first cover panel CP1 may improve impact resistance of the head mounted display device HMD. According to an embodiment, the first cover panel CP1 may include at least one selected from urethane resin, epoxy resin, polyester resin, polyether resin, acrylate resin, acrylonitrile-butadiene-styrene ("ABS") resin, and rubber. However, the present invention is not limited to the above-described examples.

When the head mounted display device HMD is mounted on the user's head, the main display module MDM may be positioned in front of the user's eyes 40.

The main display module MDM may output a main image. The main display module MDM may output the main image in a direction toward the user's eyes 40. The main image may be provided in the form of visual information including the image data. Light representing the main image may pass through an inner area 21 (hereinafter, referred to as a first space) defined by the main optical block MOB, and may be provided to a point corresponding to a focus of the user's eyes 40 by the first lens assembly LA1.

Like the main display module MDM, when the head mounted display device HMD is mounted on the user's head, the main optical block MOB may be positioned in front of the user's eyes 40. However, the main optical block MOB may be positioned closer to the user's eyes 40 than the main display module MDM. The main optical block MOB may be positioned between the first lens assembly LA1 and the main display module MDM.

The main optical block MOB may shield at least a portion of light emitted from the main display module MDM. The main optical block MOB may prevent the light representing the main image output from the main display module MDM from being emitted to an area (for example, an external area) other than the user's eyes 40.

The main optical block MOB may define a light path through which the light representing the main image output from the main display module MDM moves. According to an embodiment, the main optical block MOB may be provided in a form surrounding the light path toward the first lens assembly LA1.

The first lens assembly LA1 may be positioned in front of the user's eyes 40. The first lens assembly LA1 may be positioned closer to the user's eyes 40 than the main optical block MOB and/or the main display module MDM.

The first lens assembly LA1 may change the path of the light representing the main image so that the light representing the main image provided from the main display module MDM arrives to the focus of the user's eyes 40.

According to an embodiment, the first lens assembly LA1 may include a transparent material including glass, plastic, or the like. For example, the first lens assembly LA1 may be provided in the form of at least one lens selected from a spherical lens, an achromatic lens, and an aspheric lens. Alternatively, according to another embodiment, the first lens assembly LA1 may be provided in the form of a Fresnel Lens formed of an etched continuous concentric groove.

The second cover panel CP2 may be positioned on one surface of the main optical block MOB. The second cover panel CP2 may be disposed between the first sub-display module SDM1 and the main optical block MOB.

Like the first cover panel CP1, the second cover panel CP2 may reduce the external influence (e.g., damage from external force, and penetration of foreign substance) applied to the first sub-display module SDM1. The second cover panel CP2 may improve the impact resistance of the head mounted display device HMD. The second cover panel CP2 may include the same material as the first cover panel CP1.

When the head mounted display device HMD is mounted on the user's head, the first sub-display module SDM1 may be positioned in front of the user's eyes 40.

The first sub-display module SDM1 may be positioned on one side surface of the main optical block MOB. The side surface of the main optical block MOB may be a surface between main display module MDM and first lens assembly LA1 and not directly faced to the user's eyes 40. According to an embodiment, when viewed in a direction in which the user's eyes 40 look at the display unit 20, the first sub-display module SDM1 may be arranged on the right side surface of the main optical block MOB.

The first sub-display module SDM1 may output a first sub-image. The first sub-display module SDM1 may emit the light representing the first sub-image in a direction not facing the user's eyes 40. The first sub-display module SDM1 may output the light representing the first sub-image so that the light representing the first sub-image does not face the second lens assembly LA2 directly.

Like the main image, the first sub-image may be provided in the form of visual information including the image data. The light representing the first sub-image may be provided to the first light path converter LDS1 facing the first sub-display module SDM1. The light representing the first sub-image provided to the first light path converter LDS1 may pass through an inner area 27 (hereinafter, referred to as a second space) defined by the first sub-optical block SOB1 and the first light path converter LDS1, and may be provided to the point corresponding to the focus of the user's eyes 40 by the second lens assembly LA2.

The first sub-image may be an image representing a predetermined edge area of the main image. The first sub-image may be an image output from one area of the main display module MDM adjacent to the first sub-display module SDM1. A corresponding relationship between the main image and the first sub-image will be described later with reference to FIG. 7, and thus detailed descriptions thereof will be omitted here.

The first light collimator LP1 may be positioned on one surface of the first sub-display module SDM1 facing the first light path converter LDS1.

The first light collimator LP1 may change the light provided from the first sub-display module SDM1 into collimated light. At least a portion of the light representing the first sub-image passing through the first light collimator LP1 may have collimated light properties. The path of the collimated light representing the image by the first light collimator LP1 may be changed by the first light path converter LDS1 and the second lens assembly LA2, and may be provided to the user's eyes 40 with uniform luminance.

According to an embodiment, the first light collimator LP1 may be implemented with at least one of a micro lens array, a micro lens plate, or a pin-hole layer, but the present invention is not limited to the above-described examples.

The first sub-optical block SOB1 may be positioned on at least one side of the main optical block MOB. For example, when viewed in the direction in which the user's eyes 40 look at, the first sub-optical block SOB1 may be positioned on the right side of the main optical block MOB.

The position of the first sub-optical block SOB1 may correspond to that of the first sub-display module SDM1. According to an embodiment, when the first sub-display module SDM1 is arranged on a first surface of the main optical block MOB, the first sub-optical block SOB1 may be positioned in front of the first surface of the main optical block MOB. Alternatively, when the first sub-display module SDM1 is arranged on a second surface of the main optical block MOB, the first sub-optical block SOB1 may be positioned in front of the second surface of the main optical block MOB.

According to an embodiment, when the first surface is the right surface of the main optical block MOB with respect to the user's eyes 40, the second surface may be the left surface of the main optical block MOB. Alternatively, when the second surface is the left surface of the main optical block MOB with respect to the user's eyes 40, the second surface may be the right surface of the main optical block MOB.

The first sub-optical block SOB1 may be provided in a form surrounding the first sub-display module SDM1. The first sub-optical block SOB1 may shield at least a portion of the light representing the first sub-image so that the first sub-image provided from the first sub-display module SDM1 is not exposed to an outside.

The first sub-optical block SOB1 may fix the positions of the first light path converter LDS1 and/or the second lens assembly LA2.

The first light path converter LDS1 may be positioned on one surface inside the first sub-optical block SOB1. The first light path converter LDS1 may face the first sub-display module SDM1. Accordingly, the first light path converter LDS1 may receive light from the first sub-display module SDM1. According to an embodiment, an area of the first light path converter LDS1 may be larger than that of the first sub-display module SDM1. Accordingly, the first light path converter LDS1 may receive the light provided from the first sub-display module SDM1 substantially without loss.

The first light path converter LDS1 may reflect the light provided from the first sub-display module SDM1. According to an embodiment, the first light path converter LDS1 may change the path of the light representing the first sub-image obtained from the first sub-display module SDM1 to face the second lens assembly LA2. The light representing the first sub-image may be provided to the focus location of the user's eyes 40 by the first light path converter LDS1 and the second lens assembly LA2.

The first light path converter LDS1 may be implemented as a reflective type diffraction grating. The reflective type diffraction grating may mean a member in which a material having reflective properties is provided on a surface including grooves defined in a specific period (or pattern). According to an embodiment, the reflective type diffraction grating may be provided in a form in which a metal material is coated on a plate in which predetermined grooves are defined. The metal material may include aluminum (Al) or gold (Au), but is not limited to a specific material. Since the first light path converter LDS1 is provided as the reflective type diffraction grating, even when the incident light is bent in a desired direction, loss of the intensity of reflected light can be effectively minimized.

According to an embodiment, the first light path converter LDS1 may include or be formed of a surface curved type diffraction element or a volume type hologram diffraction element on a transparent material including glass, plastic, or the like.

Alternatively, the first light path converter LDS1 may be a reflective member that is not implemented as a diffraction grating. According to an embodiment, the reflective member may be provided as a mirror. In this case, although not shown in the drawings, a layer including a diffractive type transmission element (i.e., light transmission type diffraction unit) may be positioned on the first sub-display module SDM1. The diffractive type transmission element may mean the diffraction grating. Even when the first light path converter LDS1 is the reflective member that is not implemented as the diffraction grating, since the diffractive type transmission element is disposed on the first sub-display module SDM1, reflection efficiency of the light reflected from the first light path converter LDS1 may be improved. Here, the light reflected may be reflected light of the first sub-image output from the first sub-display module SDM1.

The second lens assembly LA2 may be positioned in front of the user's eyes 40. The second lens assembly LA2 may be positioned closer to the user's eyes 40 than the first sub-optical block SOB1 and/or the first sub-display module SDM1.

The second lens assembly LA2 may change the path of the light representing the first sub-image so that the light representing the first sub-image provided from the first sub-display module SDM1 arrives to the focus of the user's eyes 40.

The first lens assembly LA1 and the second lens assembly LA2 may be separate components, but they may be provided in a form in which at least some of them are in contact with each other, or may be implemented as a single lens assembly. However, the present invention is not limited thereto.

Figure 6:
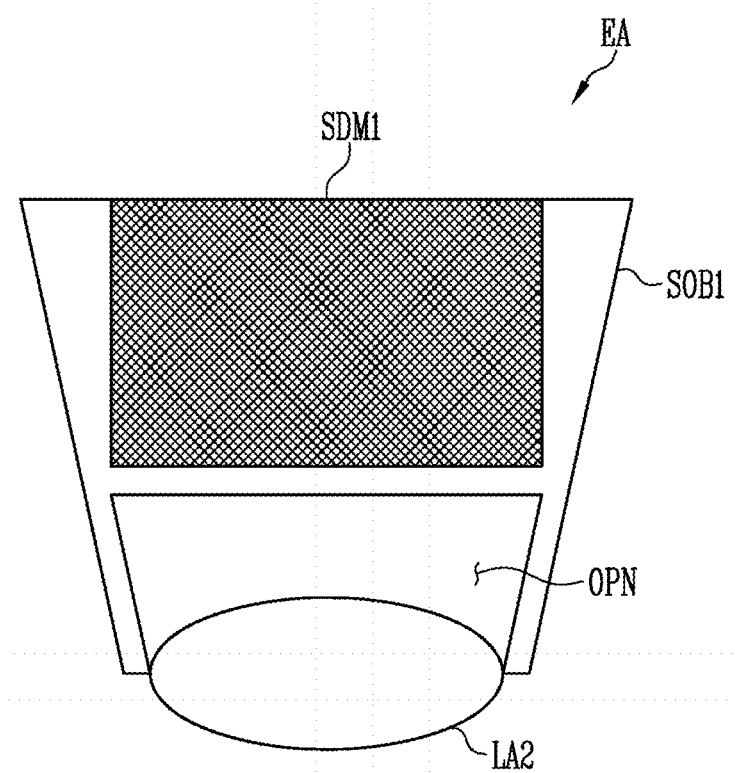
FIG. 6 is a diagram schematically illustrating an area EA of FIG. 5.

FIG. 6 is a diagram schematically illustrating an area EA of FIG. 5.

Referring to FIG. 6, the display unit 20 may defined an opening OPN. The opening OPN may be defined by the second lens assembly LA2 and the first sub-optical block SOB1. Alternatively, although not shown in the drawings, the opening OPN may be defined by the first lens assembly LA1 and the first sub-optical block SOB1 or a single lens assembly and the first sub-optical block SOB1.

The opening OPN may fluidly connect the first space 21 (refer to FIG. 5) and the second space 27 (refer to FIG. 5). As used herein, "fluidly connect" means that fluid is able to flow from one component to another, but the two components need not be physically connected to one another. The first space 21 may mean the inner area through which the light representing the main image provided from the main display module MDM passes. The second space 27 may mean the inner area through which the light representing the first sub-image provided from the first sub-display module SDM1 passes.

Since the opening OPN is formed, even when the light representing the main image provided from the main display module MDM and the light representing the first sub-image provided from the first sub-display module SDM1 are simultaneously provided to the user's eyes 40, the user may not feel a sense of difference.

Figure 7:
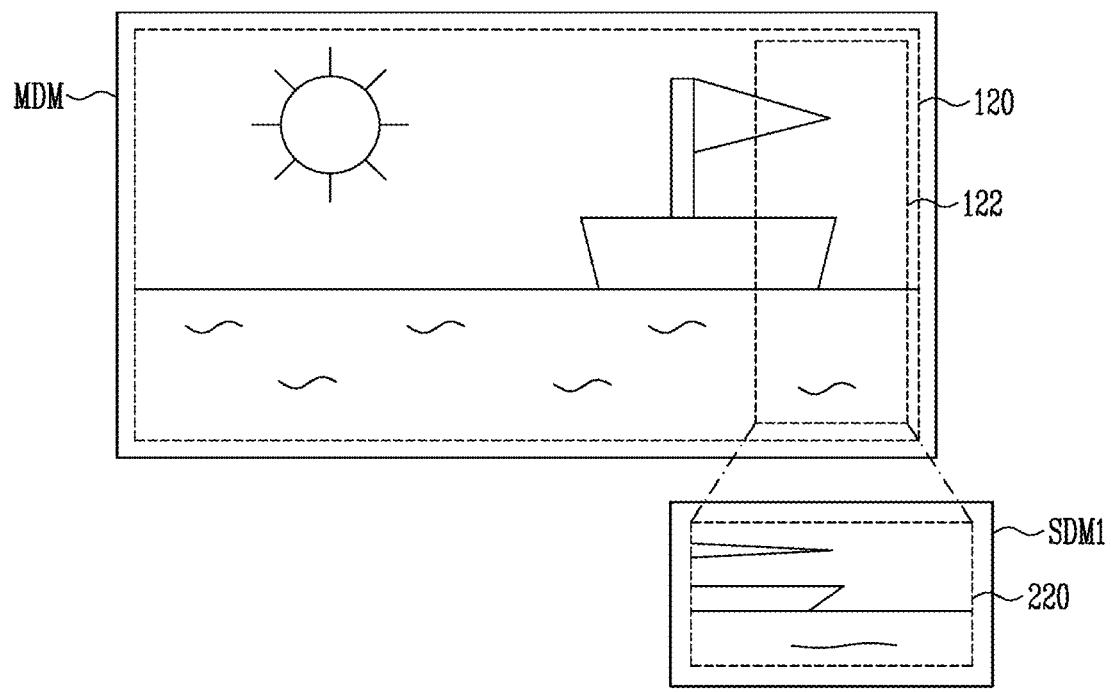
FIG. 7 is a diagram illustrating content of an image provided from the display unit of the head mounted display device according to an embodiment of the present invention.

FIG. 7 is a diagram illustrating content of an image provided from the display unit of the head mounted display device according to an embodiment of the present invention.

Referring to FIG. 7, the main display module MDM may include a main image area 120 in which the main image is output. The main image area 120 may correspond to the display area DA described with reference to FIG. 2.

The main image area 120 may include a first edge image area 122. The first edge image area 122 may be positioned in the main image area 120. The main display module MDM may output a first edge portion image in the first edge image area 122. The first edge portion image is an edge portion of the main image output from the main image area 120.

The first edge image area 122 may mean a predetermined specific area (i.e., an edge part) of the main image area 120.

In an embodiment, for example, the first edge image area 122 may be a rectangular area on the right side of the main image area 120. A vertical length of the first edge image area 122 may be equal to or smaller than that of the main image area 120. Embodiments of the first edge image area 122 according to the invention may be provided in various ways, and are not limited to the above-described examples.

The first edge image area 122 may be determined by a position of the first sub-display module SDM1.

In an embodiment, for example, when the first sub-display module SDM1 is positioned on the right side of the main display module MDM, the first edge image area 122 may mean an area positioned to the right side of the main image area 120. Alternatively, when the first sub-display module SDM1 is positioned on the left side of the main display module MDM, the first edge image area 122 may mean an area positioned to the left side of the main image area 120.

The first sub-display module SDM1 may include a first sub-image area 220 in which the first sub-image is output. The first sub-image area 220 may be included in the display area DA described with reference to FIG. 2.

The first sub-image output from the first sub-image area 220 may correspond to the first edge portion image output from the first edge image area 122. The first sub-image may differ only in horizontal and/or vertical ratios from the first edge portion image, and may include image information identical to each other. According to an embodiment, a horizontal length of the first sub-image may be longer than that of the first edge portion image, and a vertical length of the first sub-image may be shorter than that of the first edge portion image.

As described with reference to FIG. 5, the light representing the main image provided from the main display module MDM and the light representing the first sub-image provided from the first sub-display module SDM1 may be provided to the user's eyes 40. Since the first sub-image is an image of the edge area of the main image, the user may visually recognize the main image as an image extending further in a predetermined direction.

Hereinafter, another embodiment of the present invention will be described. However, hereinafter, descriptions that may overlap with the above-described technical configurations and features will be omitted. The meaning of the another embodiment described below should be interpreted in consideration of the above-described descriptions.

Figure 8:
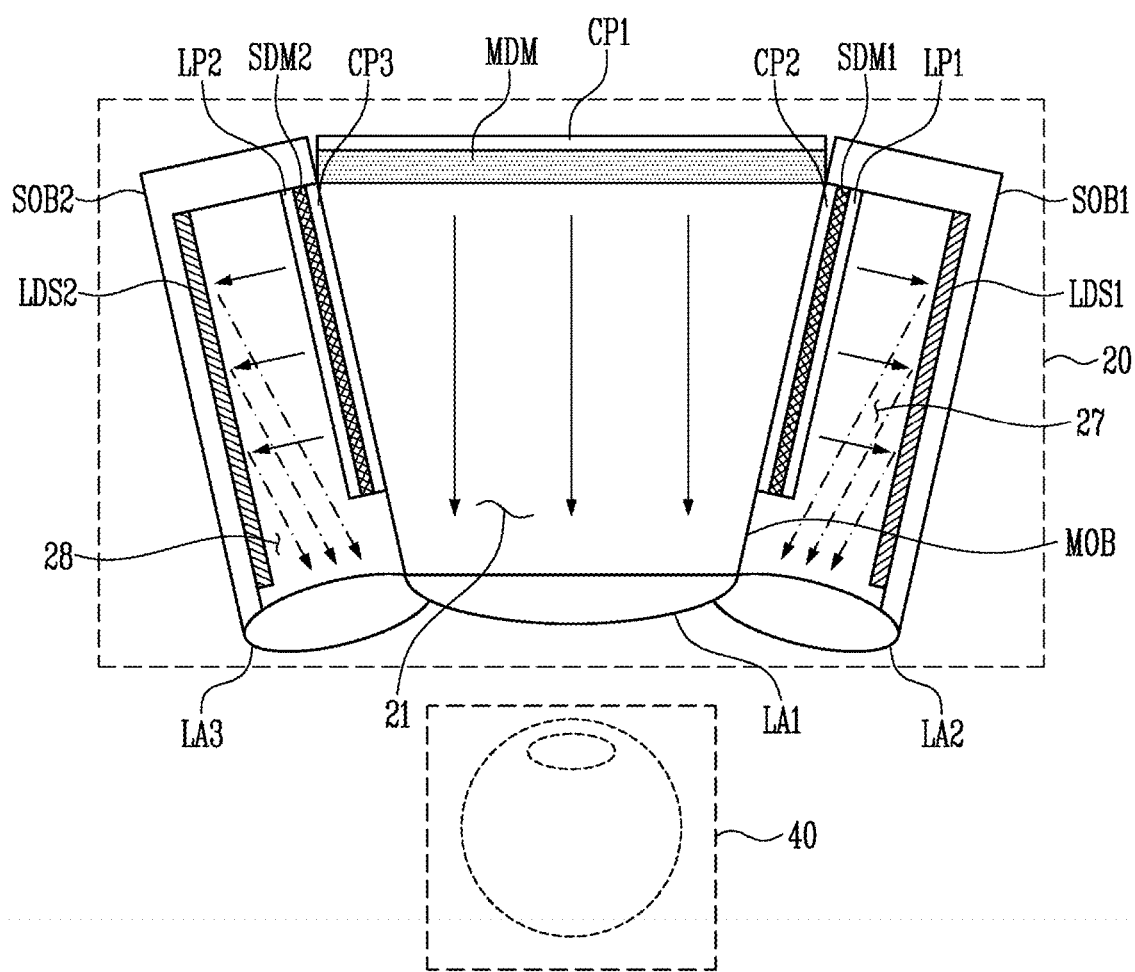
FIG. 8 is a plan view illustrating a display unit of a head mounted display device according to another embodiment of the present invention.

FIG. 8 is a plan view illustrating a display unit of a head mounted display device according to another embodiment of the present invention.

When viewed in the direction in which the user's eyes 40 look at, the display unit 20 may include predetermined "sub-display modules" on the left and right sides, respectively.

Referring to FIG. 8, the display unit 20 may further include a third cover panel CP3, a second sub-display module SDM2, a second sub-optical block SOB2, a second light path converter LDS2, and a second light collimator LP2.

The third cover panel CP3 may be positioned on another surface of the main optical block MOB where the second cover panel CP2 is not positioned. According to an embodiment, when the second cover panel CP2 is positioned on the right side when viewed in the direction in which the user's eyes 40 look at, the third cover panel CP3 may be positioned on the left side surface of the main optical block MOB.

The second sub-display module SDM2 may be positioned on the third cover panel CP3. In this case, the second sub-display module SDM2 may mean the display panel DP described with reference to FIGS. 2 to 4.

The second sub-display module SDM2 may output a second sub-image. In other words, the second sub-display module SDM2 may output the light representing the second sub-image so that the light representing the second sub-image does not face the third lens assembly LA3.

Like the first sub-image, the second sub-image may be provided in the form of visual information including the image data. The light representing the second sub-image may be provided to the second light path converter LDS2 facing the second sub-display module SDM2. The light representing the second sub-image provided to the second light path converter LDS2 may pass through an inner area 28 (hereinafter, referred to as a third space) defined by the second sub-optical block SOB2, and may be provided to a specific point of the user's eyes 40 by the third lens assembly LA3. The third space 28 may be fluidly connected to the first space 21.

The second sub-image may be an image of a predetermined edge area of the main image. The second sub-image may be an image output from one area of the main display module MDM adjacent to the second sub-display module SDM2 in the main display module MDM.

The second sub-image may be different from the first sub-image output from the first sub-display module SDM1.

For example, the first sub-image may be optical data of a predetermined area positioned on the right side of the main image output by the main display module MDM, but the second sub-image may mean optical data of a predetermined area positioned on the left side of the main image output by the main display module MDM.

A corresponding relationship between the second sub-image and the main image and the first sub-image will be described later with reference to FIG. 9, and thus detailed descriptions thereof will be omitted.

The second light collimator LP2 may be positioned on one surface of the second sub-display module SDM2 facing the second light path converter LDS2.

The second light collimator LP2 may change the light provided from the second sub-display module SDM2 into collimated light. At least a portion of the light representing the second sub-image passing through the second light collimator LP2 may have the collimated light properties.

According to an embodiment, like the first light collimator LP1, the second light collimator LP2 may be implemented with at least one of the micro lens array, the micro lens plate, or the pin-hole layer, but the present invention is not limited to the above-described examples.

The second sub-optical block SOB2 may be positioned on at least one side of the main optical block MOB. For example, when viewed in the direction in which the user's eyes 40 look at, the second sub-optical block SOB2 may be positioned on the left side of the main optical block MOB.

The second sub-optical block SOB2 may be provided in a form surrounding the second sub-display module SDM2. The second sub-optical block SOB2 may shield at least a portion of the light representing the second sub-image so that the light representing the second sub-image provided from the second sub-display module SDM2 is not exposed to the outside.

The second sub-optical block SOB2 may fix the second light path converter LDS2 and/or the third lens assembly LA3.

The second light path converter LDS2 may be positioned on one surface inside the second sub-optical block SOB2. The second light path converter LDS2 may receive light from the second sub-display module SDM2.

The second light path converter LDS2 may reflect the light provided from the second sub-display module SDM2 and provide the reflected light to the third lens assembly LA3.

According to an embodiment, the second light path converter LDS2 may change the path of the light representing the second sub-image obtained from the second sub-display module SDM2 to face the third lens assembly LA3. The light representing the second sub-image may be provided to the focus of the user's eyes 40 by the second light path converter LDS2 and the third lens assembly LA3.

Like the first light path converter LDS1 described with reference to FIGS. 5 to 7, the second light path converter LDS2 may be implemented as the reflective type diffraction grating. Alternatively, the second light path converter LDS2 may be the reflective member (e.g., a mirror) that is not implemented as the diffraction grating. In this case, the layer including the diffractive type transmission element may be positioned on the second sub-display module SDM2.

The third lens assembly LA3 may be positioned in front of the user's eyes 40. The third lens assembly LA3 may be positioned closer to the user's eyes 40 than the second sub-optical block SOB2 and/or the second sub-display module SDM2.

The third lens assembly LA3 may change the path of the light representing the second sub-image so that the light representing the second sub-image provided from the second sub-display module SDM2 may arrive to the focus of the user's eyes 40.

The first lens assembly LA1, the second lens assembly LA2, and the third lens assembly LA3 may be separate components, but they may be provided in a form in which at least some of them are in contact with each other, or may be implemented as a single lens assembly. However, the present invention is not limited thereto.

Figure 9:
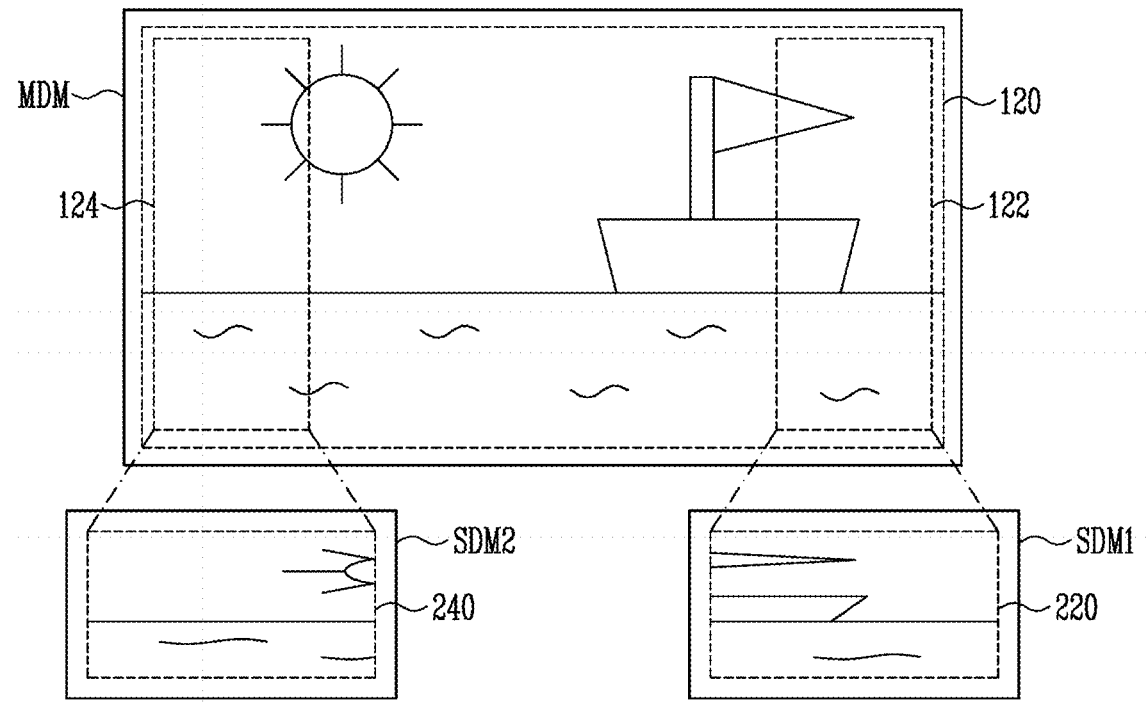
FIG. 9 is a diagram illustrating content of an image provided from the display unit of the head mounted display device according to another embodiment of the present invention.

FIG. 9 is a diagram illustrating content of an image provided from the display unit of the head mounted display device according to another embodiment of the present invention.

Referring to FIG. 9, the main display module MDM may include the main image area 120 in which the main image is output. The main image area 120 may mean the display area DA described with reference to FIG. 2.

The main image area 120 may include the first edge image area 122 and a second edge image area 124. The first edge image area 122 and the second edge image area 124 may be positioned in the main image area 120.

The second edge image area 124 may mean a predetermined specific area of the main image area 120.

The second edge image area 124 may be defined by a position of the second sub-display module SDM2.

For example, as described with reference to FIG. 8, when the second sub-display module SDM2 is positioned on the left side of the main optical block MOB when viewed in the direction in which the user's eyes 40 look at, the second edge image area 124 may mean an area positioned to the left side of the main image area 120.

The second sub-display module SDM2 may include a second sub-image area 240 in which the second sub-image is output. The second sub-image area 240 may mean the display area DA described with reference to FIG. 2.

The second sub-image output from the second sub-image area 240 may correspond to the second edge portion image output from the second edge image area 124. According to an embodiment, the second sub-image may include the same image information as the second edge portion image, but may have different horizontal and/or vertical ratios.

The first sub-image output from the first sub-display module SDM1 may be an image of a right area of the main image output from the main display module MDM. However, the second sub-image output from the second sub-display module SDM2 may mean an image of a left area of the main image output from the main display module MDM.

As a result, according to the another embodiment, the user may simultaneously receive the main image, the first sub-image, and the second sub-image by the head mounted display device HMD. In this case, the image data provided to the user may be provided to the user as an image extending to the right and left sides by the first sub-image and the second sub-image, respectively. The user can visually recognize the provided image data as image data having a wide viewing angle.

Hereinafter, a method of providing content using a head mounted display device HMD according to an embodiment of the present invention will be described with reference to FIG. 10.

However, the method of providing the content is a method of using the head mounted display device HMD according to the embodiment of the present invention, and will be described with reference to FIGS. 5 to 9 as necessary.

FIG. 10 is a flowchart illustrating a method of providing content using a head mounted display device according to an embodiment of the present invention.

Referring to FIG. 10, a method of providing content using a head mounted display device according to an embodiment of the present invention may include outputting a main image by a main display module (S12); outputting a first sub-image by a first sub-display module (S14); providing the main image to a first lens assembly (S16); providing the first sub-image to a second lens assembly by a first light path converter (S18); and simultaneously providing the main image and the first sub-image to a user (S19).

In the outputting the main image (S12), the main image may be output from the main display module MDM. The output main image may be shielded by the main optical block MOB so that the output main image is not exposed to an outside.

In the outputting the first sub-image (S14), the first sub-display module SDM1 may output the first sub-image. According to an embodiment, when the second sub-display module SDM2 is further included in the head mounted display device HMD, although not shown in the drawings, the second sub-display module SDM2 may output a second sub-image in this step.

However, the order in which the outputting the main image (S12) and the outputting the first sub-image (S14) are performed is not limited by FIG. 10. According to an embodiment, the steps (S12 and S14) may be performed simultaneously.

After the outputting the main image (S12), in the applying the main image to the first lens assembly (S16), the main image provided from the main display module MDM may be provided to the first lens assembly LA1.

After the outputting the first sub-image (S14), in the applying the first sub-image to the second lens assembly (S18), the first sub-image provided from the first sub-display module SDM1 may be reflected by the first light path converter LDS1 and provided to the second lens assembly LA2. In this case, as described above, the first sub-image may be an edge portion image of the main image. Although not shown in FIG. 10, when outputting the second sub-image is further performed, applying the second sub-image to a third lens assembly may be further performed.

After the applying the main image to the first lens assembly (S16) and the applying the first sub-image to the second lens assembly (S18) are performed, the simultaneously providing the main image and the first sub-image to the user (S19) may be performed.

In the simultaneously providing the main image and the first sub-image to the user (S19), the main image and the first sub-image may be simultaneously provided to the user wearing the head mounted display device HMD.

Since the main image and the first sub-image identical to the image corresponding to the edge area of the main image are simultaneously provided to the user, the user can visually recognize the image as an image extending in at least one direction.

As a result, in the simultaneously providing the main image and the first sub-image to a user (S19), the main image and the first sub-image may be provided to the user with a wider viewing angle compared to the case where only the main image is provided.

According to the embodiments of the present invention, the head mounted display device in which a viewing angle is improved and an increase in mass and volume is minimized by additionally including an auxiliary display and a reflective element, and the method of providing content using the same may be provided.

Effects of the present invention are not limited to the above-described effects, and effects that are not mentioned may be clearly understood by those skilled in the art from the present specification and the accompanying drawings.

The above-described descriptions are merely illustrative of the technical spirit of the present invention. Those skilled in the art will appreciate that various modifications and changes can be made to the present invention without departing from the spirit and scope of the invention. Accordingly, the embodiments of the present invention described above may be implemented separately or in combination with each other.

Accordingly, the embodiments disclosed in the present specification are not intended to limit the technical spirit of the present invention, but to explain the technical spirit. The scope of the technical spirit of the present invention is not limited by these embodiments. The scope of protection of the present invention should be interpreted by the appended claims, and all technical spirits within the scope equivalent thereto should be construed as being included in the scope of the present invention.

What is claimed is:

1. A head mounted display device comprising:
   a lens assembly which changes a path of light;
   a main display module which outputs a main image and is positioned in front of the lens assembly;
   a main optical block which shields at least a portion of a light representing the main image such that the light representing the main image faces the lens assembly;
   a sub-display module disposed on a side of the main optical block and which outputs a sub-image;
   a sub-optical block positioned on the side of the main optical block and which shields at least a portion of a light representing the sub-image; and
   a light path converter positioned in the sub-optical block and which changes a path of the light representing the sub-image such that the light representing the sub-image faces the lens assembly.

2. The head mounted display device of claim 1, wherein the light path converter includes a reflective type diffraction grating.

3. The head mounted display device of claim 1, wherein the light path converter is positioned in the sub-optical block to face a surface of the sub-display module from which the sub-image is provided.

4. The head mounted display device of claim 1, wherein the light representing the sub-image is provided to the light path converter along a first direction, and is reflected from the light path converter to be provided to the lens assembly along a second direction different from the first direction.

5. The head mounted display device of claim 1, wherein the lens assembly changes a path of the light representing the main image and a path of the light representing the sub-image to provide the lights to a position corresponding to a focus of user's eyes.

6. The head mounted display device of claim 1, further comprising:
   a light collimator positioned on the sub-display module and which changes the light representing the sub-image provided from the sub-display module into collimated light.

7. The head mounted display device of claim 1, wherein the main optical block is positioned between the lens assembly and the main display module.

8. The head mounted display device of claim 1, wherein the sub-image corresponds to an edge portion image of the main image.

9. The head mounted display device of claim 8, wherein the edge portion image of the main image is an image output from a partial area adjacent to the sub-display module in the main display module.

10. The head mounted display device of claim 1, wherein the sub-display module includes a first sub-display module and a second sub-display module,
    wherein the first sub-display module is disposed on a first surface of the main optical block, and
    wherein the second sub-display module is disposed on a second surface of the main optical block facing the first surface.

11. The head mounted display device of claim 10, wherein the sub-image is an edge portion image of the main image,
    wherein the edge portion image of the main image includes a first edge portion image and a second edge portion image,
    wherein the first edge portion image corresponds to an image output from a first partial area of the main display module adjacent to the first sub-display module, and
    wherein the second edge portion image corresponds to an image output from a second partial area of the main display module adjacent to the second sub-display module.

12. The head mounted display device of claim 1, wherein the head mounted display device defines:
    a first space positioned between the main optical block and the lens assembly;
    a second space positioned between the sub-optical block and the light path converter; and an opening fluidly connecting the first space and the second space.

13. The head mounted display device of claim 1, further comprising:
a light transmission type diffraction unit positioned on the sub-display module and which changes a direction of the light output from the sub-display module.

14. The head mounted display device of claim 1, wherein the main display module and the sub-display module are separate components.

15. The head mounted display device of claim 1, wherein the main display module and the sub-display module include a predetermined display panel, and
wherein the predetermined display panel is at least one of an organic light emitting display panel, a nano-scale LED display panel, a quantum dot organic light emitting display panel, a liquid crystal display panel, an electrophoretic display panel, or an electro-wetting display panel.

16. The head mounted display device of claim 1, wherein the lens assembly is disposed to correspond to a position of a user's eyes when the user wears the head mounted display device.

17. A method of providing content using a head mounted display device including a lens assembly which changes a path of light; a main display module outputting a main image and positioned in front of the lens assembly; a main optical block which shields at least a portion of a light representing the main image such that the light representing the main image faces the lens assembly; a sub-display module disposed on a side of the main optical block and which outputs a sub-image; a sub-optical block positioned on the side of the main optical block and which shields at least a portion of a light representing the sub-image such that the light representing the sub-image is not exposed to an outside; and a light path converter positioned in the sub-optical block and which changes a path of the light representing the sub-image so that the light representing the sub-image faces the lens assembly, comprising:
outputting, by the main display module, the main image;
outputting, by the sub-display module, the sub-image corresponding to a part of the main image output from an edge area of the main display module;
providing the light representing the main image to the lens assembly;
providing, by the light path converter, the light representing the sub-image to the lens assembly; and
simultaneously providing the main image provided to the lens assembly and the sub-image provided to the lens assembly by the light path converter to a user.

18. The method of claim 17, wherein the edge area of the main display module is a partial area of the main display module adjacent to the sub-display module.

19. The method of claim 17, wherein the light path converter is positioned in the sub-optical block to face a surface of the sub-display module from which the sub-image is provided.

20. The method of claim 17, wherein in the simultaneously providing of the main image and the sub-image, a viewing angle for the main image and the sub-image provided to the user increases compared with a viewing angle only for the main image.

* * * * *